United States Patent [19]

Johnson

[11] Patent Number: 4,718,550
[45] Date of Patent: Jan. 12, 1988

[54] THERMOFORMED COMPOSITE CASSETTE ALBUM

[76] Inventor: Breck J. Johnson, 4555 Juneau La., Plymouth, Minn. 55446

[21] Appl. No.: 922,992

[22] Filed: Oct. 24, 1986

[51] Int. Cl.$^4$ ............................................. B65D 85/672
[52] U.S. Cl. .................................. 206/387; 206/459; 206/472; 220/339
[58] Field of Search .................. 53/453; 156/245, 250; 206/45.13, 232, 311, 387, 444, 472, 524.2, 524.3, 557, 564, 45.23, 459; 220/339, 461, 462; 281/17, 31, 29; 402/73, 80 P, 502

[56] References Cited

U.S. PATENT DOCUMENTS

| | | |
|---|---|---|
| 2,767,756 | 10/1956 | Niles . |
| 2,828,975 | 4/1958 | Wright ................................. 281/31 |
| 3,315,718 | 4/1967 | Berman . |
| 3,442,371 | 5/1969 | Deshong . |
| 3,743,081 | 7/1973 | Roberg . |
| 3,902,598 | 9/1975 | Koob et al. . |
| 4,341,307 | 7/1982 | Shyers . |
| 4,407,410 | 10/1983 | Graetz et al. ........................ 206/387 |
| 4,432,827 | 2/1984 | Graetz et al. ........................ 206/387 |
| 4,501,361 | 2/1985 | Rose, Jr. ............................... 206/387 |
| 4,518,275 | 5/1985 | Rauch, III et al. .................. 206/387 |
| 4,552,479 | 11/1985 | Nickow et al. ....................... 281/31 |
| 4,582,442 | 4/1986 | Rager ................................... 281/29 |

FOREIGN PATENT DOCUMENTS

| | | | |
|---|---|---|---|
| 3325394 | 1/1985 | Fed. Rep. of Germany ...... 206/387 |
| 2518297 | 6/1983 | France ................................. 206/387 |

Primary Examiner—Jimmy G. Foster
Attorney, Agent, or Firm—James V. Harmon

[57] ABSTRACT

A composite thermoformed cassette album or cover is described in the style of a book having a front and rear cover with a connecting spine between them. The album is formed from a base or backing sheet of relatively stiff material which extends throughout the width and breadth of the front and rear covers and through the spine area. It includes a thermoformed tray on the rear cover to hold the cassette. Soft vinyl sheet material is laminated over the outside surface of the stiff plastic sheet. A soft front cover liner laminated to the inside of the front cover includes a medial spine extension that extends throught the spine area. The soft plastic encapsulates the ridged plastic in a 3 layer laminate throughtout a pair of parallel hinges thereby prolonging their life.

6 Claims, 7 Drawing Figures

THERMOFORMED COMPOSITE CASSETTE ALBUM

BACKGROUND OF THE INVENTION

This invention relates to an improved thermoformed cassette album. It is particularly useful for shipping and storing audio books and similar cassettes. The invention provides an album in which a single plastic sheet provides stiffness for both the front and back cover. Both the inner and outer surfaces of the front cover are capable of receiving print such as the title, directions and the like. Crack resistant hinges are provided through the provision of a three-layer laminate wherein inner and outer layers are rendered relatively supple by means of a plasticizer.

In the prior art, the problem of cracking at the hinge along each edge of the spine has been recognized. For example, as described in U.S. Pat. No. 4,407,410, the seals commonly used along each edge of the spine are eliminated. Instead, the spine bows outwardly and flexes across its entire width. This, however, gives the back of the spine a characteristic curved shape which is not always suitable. The covers are reinforced by cardboard insert sheets which add to the cost of the package and require additional manufacturing steps. U.S. Pat. No. 3,315,718 employs a tray and a flat cover formed from separate sheets. The device is made stiff using insert sheets. U.S. Pat. No. 3,441,371 describes a display package formed from two sheets, one of which is formed into a tray shape. Thermoformable sheet material of the type used in forming trays has poor print receiving characteristics and is not considered in the trade to be print receptive. As a result, instructions cannot be printed on the inside of the front cover. Moreover, the hinges on either side of the spine have a tendency to crack after the device has been used for a time rendering it unsightly or nonfunctional.

Another shortcoming of prior albums is that hinges are of necessity spaced from the tray because the tray must have flanges on its periphery. The resulting space between the hinges and the tray allows the cover to slide from side to side on the tray which is, of course, undesirable.

One object of the invention is to provide an improved thermoformed composite cassette album having crack resistant seams on either side of its spine and a front cover that is receptive to printing ink on its inside surface.

Another object of the invention is to provide an improved thermoformed composite album in which a single stiff backing sheet extends throughout both the front and back covers and through the spine region serving to stiffen both the front and rear covers and includes improved hinges on either side of the spine with a provision for preventing the thermoformed hinges from cracking after a short period of use.

A still further object of the invention is to provide a strong, rugged, reliable album cover having sufficient stiffness and being simplified in construction through the elimination of parts which allows it to be manufactured more efficiently and economically.

SUMMARY OF THE INVENTION

The objects of this invention are accomplished in a thermoformed composite cassette album having a front and rear cover connected by a spine and formed from a stiff thermoformable base sheet extending the width and breadth of both covers and through the spine area. The base sheet has an article holding tray molded in the back cover area. A pair of soft flexible plastic sheets include a first outer sheet of the same size as the base sheet and a second soft plastic, print-receptive sheet of a smaller size sealed over the outer surface of the front and back cover and the inner surface of the front cover respectively. The inner sheet includes a spine extension that extends on the inside of the spine area so that the stiff base sheet is sandwiched between the two soft sheets along a pair of laterally spaced apart parallel seals. Each of the seals includes a three-layer laminate at the seal whereby the stiff sheet is totally enclosed by the soft plastic material which is rendered supple by the presence of a plasticizer thereby preventing the seals from cracking after a short period of time.

DETAILED DESCRIPTION OF THE INVENTION

Figure 1:
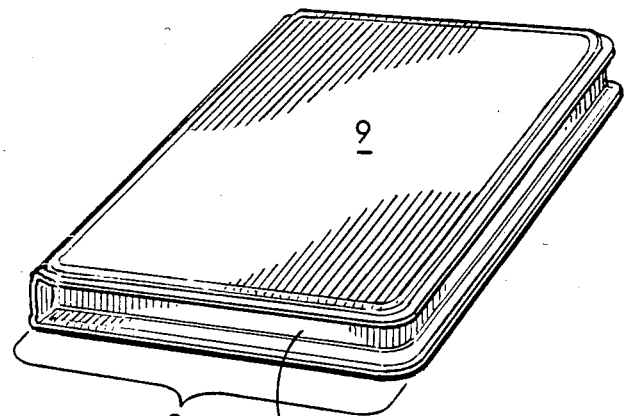
FIG. 1 is a perspective view of an album in accordance with the invention as it appears when closed.

Thermoformed album covers are used in larger numbers and ever increasing applications but in some applications such as a cover for an audio book cassette, previously available albums that have not been entirely satisfactory.

In FIGS. 1–5 is illustrated a composite cassette album that includes a back cover 8 and a front cover 9 connected together by means of a vertically extending spine 23. The album is formed from at least 3 layers of material laminated together including a thermoformable plastic base or backing sheet 10 that extends throughout the width and breadth of both the back and front covers 8 and 9 and through the spine area 23. The backing or base sheet 10 includes a thermoformed tray section co-extensive with the back cover 8 including tray pockets 10a, 10b, 10d. The base 10 also includes a stiff flat front section 10c which serves as a base or framework for the front cover 9 and provides the required stiffness for the front cover. The tray is bounded by a peripheral sidewall 11. The tray is thermoformed conventionally.

Figure 2:
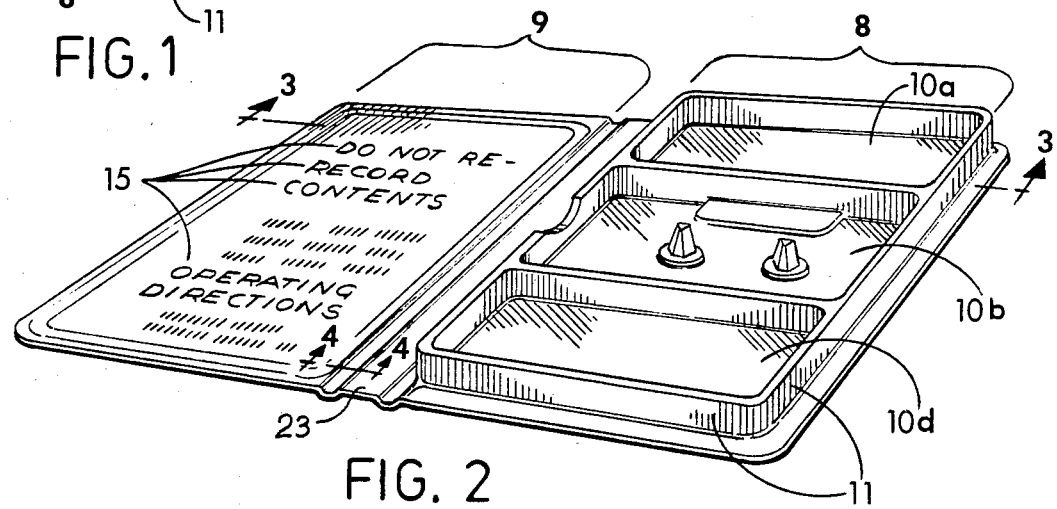
FIG. 2 is a view similar to FIG. 1 with the album open.

Bonded to the base sheet 10 are a pair of relatively soft supple plastic sheets 12 and 14, typically soft plasticized polyvinyl chloride sheet material such as a 14 gauge sheet. By "soft" is meant that the sheet material 12 and 14 is soft to the touch and will easily drape over the hand. By contrast the sheet 10 is relatively stiff or even somewhat ridged. Sheets 12 and 14 are preferably both formed from the same grade of plastic sheet material and are typically both formed from plasticized soft vinyl sheet material which is receptive to printing. This enables the album to be used with audio cassettes and other products in which printed directions such as the printing indicated at 15 in FIG. 2 are required on the inside of the front cover. Printed indicia such as the title or the like (not shown) can if desired also be provided on the front cover of the outside surface of the sheet 12.

Figure 3:
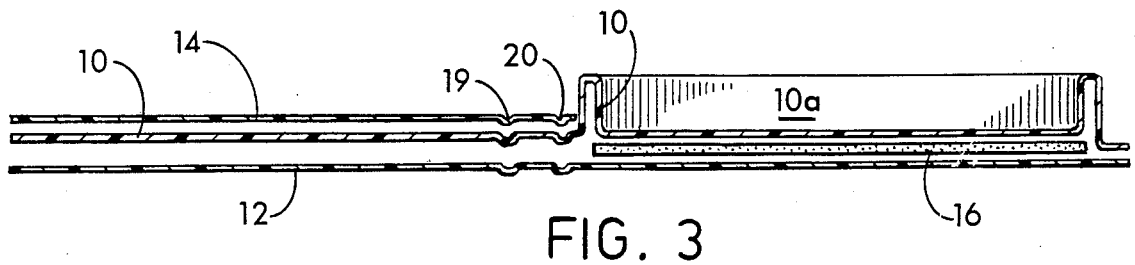
FIG. 3 is a transverse sectional view taken on line 3—3 of FIG. 2 with the layers separated for clarity of illustration.
Figure 4:
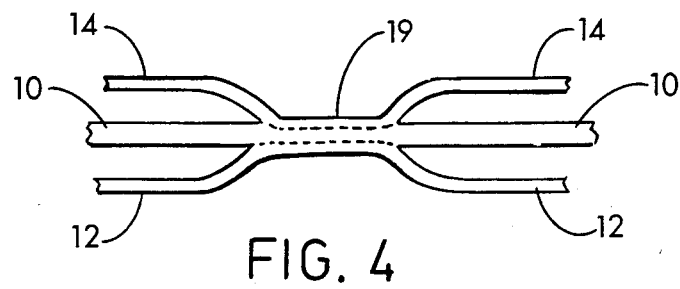
FIG. 4 is a transverse sectional view of one hinge taken on line 4—4 of FIG. 2.
Figure 5:
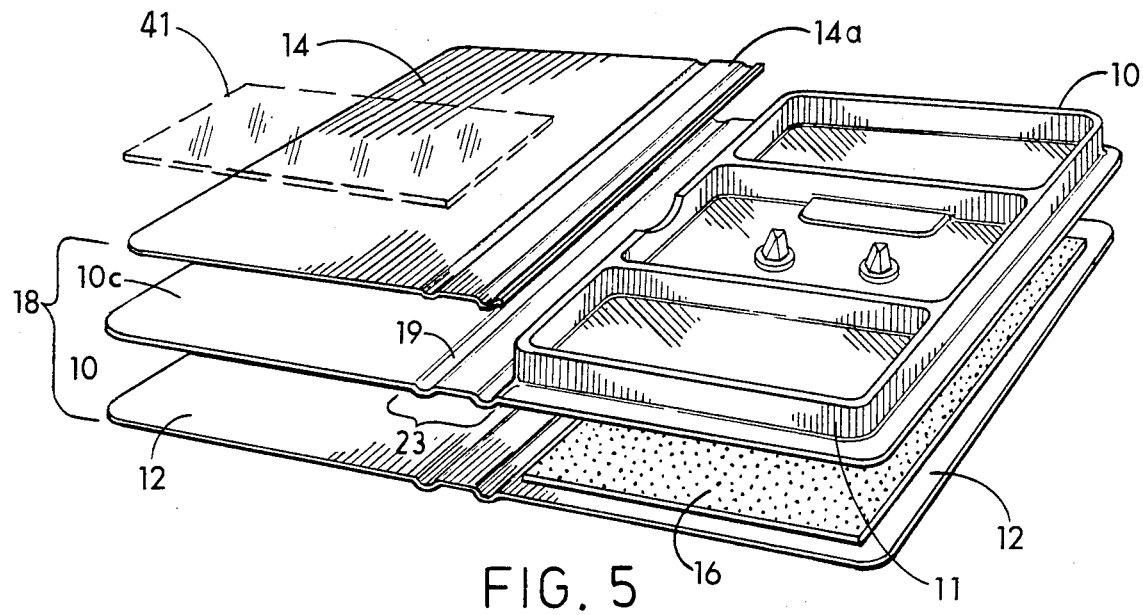
FIG. 5 is a perspective view of the invention similar to FIG. 2 with the layers separated for clarity of illustration.

Sheet 14 also includes a medial extension 14a that is superimposed upon and becomes part of the spine 23 as shown in FIGS. 3 and 4. In the spine area are provided a pair of longitudinally extending parallel heat sealed hinges 19 and 20. It can be seen that the medial extension 14a of the cover liner sheet 14 is incorporated into the seals 19 and 20. As clearly shown in FIG. 4, the stiff thermoformable sheet is formed into a 3-layer laminate in the seal 19 as well as seal 20 which is similar. The laminated seal comprises 3 thermally fused layers including a pair of outer layers composed of sheets 12 and 14 which are made relatively supple through the presence of plasticizer in the resin and a center section which is strong but relatively stiff. Thus the cover liner sheet 14 not only provides a surface receptive to printing but also makes it possible to encapsulate the stiff base sheet 10 which is susceptible to cracking in a sandwich-like laminate including 3 layers of material that resist cracking even after a substantial period of use. While the principle of operation is not known with certainty, it is believed that the center layer 10 of each of hinges 19 and 20 provides the required strength while the flexibility of the surface layers 14 and 12, through the presence of plasticizer contained in the resin, prevents cracks from initiating in the surface of either seal area 19 or 20.

Figure 6:
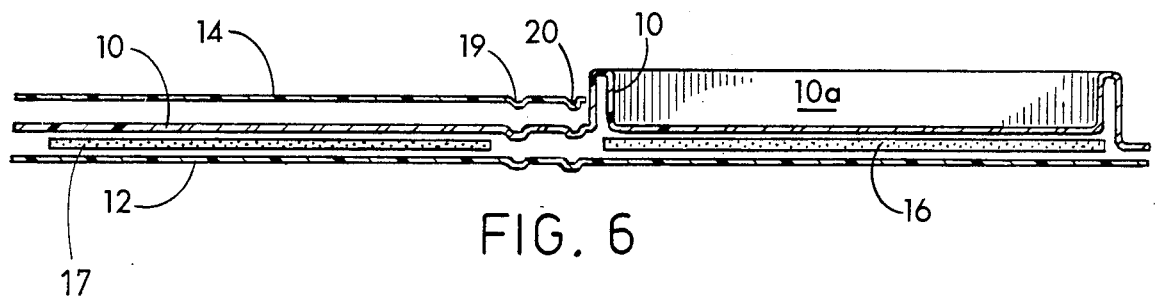
FIG. 6 is a view similar to FIG. 3 of a modified form of the invention.

If desired, an optional cardboard stiffening sheet 16 can be placed in the tray area of the back cover behind the pockets 10a, 10b, and 10d. The stiffening sheet 16 is, however, not necessary for all applications and can be eliminated if the base sheet 10 provides the required stiffness. Sheets 10, 12 and 14 are also sealed together around the entire periphery of the cover forming an edge seal to hold the sheets together at the edges. In another modified form of the invention shown in FIG. 6 an optional stiffening sheet 17 can, if desired, be laminated into the front cover between the sheet 10 and sheet 12 or 14 and held in place by means of the seals around the edges of the cover material and the heat seal 19.

All of the seals including the parallel longitudinally extending spine seals 19 and 20 and the edge seals are preferrably fused seals formed by heat and pressure. The heat can be provided conventionally by means of an RF or Radio Frequency type heater which induces heat into the superimposed layers of plastic sheet material as pressure is applied.

Figure 7:
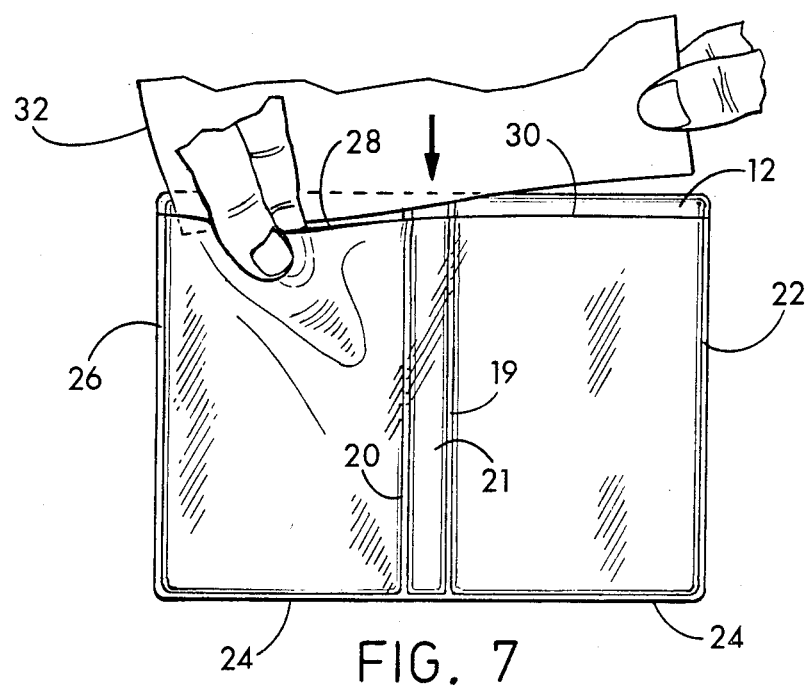
FIG. 7 is another modified form of the invention showing a plan view of the outside illustrating the insertion of printed matter into a pocket.

Refer now to FIG. 7 which illustrates another optional feature of the invention. If desired, a pocket 28 can be formed on the outside surface of the album by the provision of a clear vinyl sheet 30 which is sealed to the side edges of the cover along seal lines 22 and 26 and to the bottom edge along seal line 24. The top edge 30 however is spaced downwardly from the top edge of the album so that by placing the hand between the album and sheet 28, a pocket can be opened for the insertion of colored or printed sheet material such as a printed cover sheet 32. If a printed cover sheet 32 is not needed, the pocket 28 need not be included as a part of the album.

If desired, an optional transparent pocket sheet 41 can be bonded along both side edges and its bottom edge to the inside of the front cover sheet 14. The top edge of sheet 41 is left open for the insertion of printed matter.

While the invention is adaptable for use with a variety of materials, the stiff sheet 10 can comprise a 12 to 16 gauge sheet of stiff thermoformable vinyl plastic and the sheets 12 and 14 can comprise a soft, supple print receptive vinyl plastic, e.g., 10–14 gauge containing a plasticizer to give it the required drape and flexibility.

In the present invention, the presence of the soft vinyl sheet inside the front cover allows the hinge 20 to be placed very close or touching the tray. This helps to prevent the cover from sliding from side to side across the top of the tray.

Many variations of the invention within the scope of the appended claims will be apparent to those skilled in the art once the principles of the invention described above are understood.

What is claimed is:

1. A thermoformed composite cassette album having a front and rear cover connected by a spine, said album being formed from a stiff thermoformable base sheet extending the width and breadth of both the front and rear cover of the album and through the spine area and including an article holding tray molded in the back cover thereof with at least one pocket opening inwardly and an upstanding tray sidewall, a pair of soft flexible plastic sheets including a first outer sheet of the same size as the base sheet bonded over the outside surface of the base sheet and a second soft flexible cover liner sheet bonded to the inner surface of the front cover and including a medial extension projecting over the spine between the front and rear covers whereby the base sheet is sandwiched between the soft flexible sheets in the area of the spine and a pair spaced apart parallel vertically extending heat seals thermally bonding together 3 layers comprising the outer soft plastic sheet, the thermopormable base sheet and the medial extension of the soft plastic cover liner sheet to form a 3 layer laminate in each seal whereby the stiff plastic sheet is encapsulated between the soft plastic sheets to prolong the life thereof and the cover liner is adapted to receive printed indicia applied to the exposed surface thereof inside the front cover.

2. The album of claim 1 wherein the tray includes at least one compartment within the sidewall of the tray of a size and shape adapted to hold a cassette or similar object and a portion of said stiff sheet material extends peripherally from the tray at the edge thereof and is bonded by means of an edge seal to said soft flexible plastic cover sheet on the periphery of the tray.

3. The album of claim 2 wherein a cardboard stiffening sheet is located between the soft flexible cover sheet and the tray.

4. The album of claim 2 wherein a stiffening sheet formed from cardboard is located between 2 superimposed layers forming said album front cover.

5. The album of claim 1 wherein a pocket sheet is bonded to the outside surface of the album along 3 connected sides thereof to provide a pocket for the insertion of printed sheet material between the pocket sheet and the flexible plastic cover sheet of the album.

6. The album of claim 1 wherein said first outer sheet and said flexible cover liner sheet are rendered relatively supple by the presence of plasticizer therein.

* * * * *